(12) United States Patent
Williamson

(10) Patent No.: US 11,764,558 B2
(45) Date of Patent: Sep. 19, 2023

(54) UNIVERSAL ELECTRICAL BOX SHIELD

(71) Applicant: Corey Williamson, Vancouver, WA (US)

(72) Inventor: Corey Williamson, Vancouver, WA (US)

( * ) Notice: Subject to any disclaimer, the term of this patent is extended or adjusted under 35 U.S.C. 154(b) by 193 days.

(21) Appl. No.: 17/298,144

(22) PCT Filed: Nov. 27, 2019

(86) PCT No.: PCT/US2019/063768
§ 371 (c)(1),
(2) Date: Feb. 24, 2022

(87) PCT Pub. No.: WO2020/113114
PCT Pub. Date: Jun. 4, 2020

(65) Prior Publication Data
US 2022/0102953 A1     Mar. 31, 2022

Related U.S. Application Data

(60) Provisional application No. 62/773,705, filed on Nov. 30, 2018.

(51) Int. Cl.
*H02G 3/08* (2006.01)
*H02G 3/14* (2006.01)

(52) U.S. Cl.
CPC .................................. *H02G 3/081* (2013.01)

(58) Field of Classification Search
CPC ............ H02G 3/08; H02G 3/081; H02G 3/14; H02G 3/088; H05K 5/00; H05K 5/02; H05K 5/03

USPC ................. 174/66, 67, 50, 53, 57, 480, 481; 220/241, 242, 3.2; 33/DIG. 10, 562, 528
See application file for complete search history.

(56) References Cited

U.S. PATENT DOCUMENTS

| | | | | |
|---|---|---|---|---|
| 5,063,872 A | * | 11/1991 | Maus | B05B 12/20 118/301 |
| 5,526,952 A | * | 6/1996 | Green | H02G 3/14 220/241 |
| 6,803,522 B2 | * | 10/2004 | Skakun | H02G 3/14 174/66 |
| 6,927,341 B1 | * | 8/2005 | Crane | H02G 3/14 174/67 |
| 6,949,708 B1 | * | 9/2005 | Hausen | H02G 3/14 174/66 |
| 7,071,413 B1 | * | 7/2006 | Paape | H02G 1/00 174/67 |

(Continued)

*Primary Examiner* — Angel R Estrada
(74) *Attorney, Agent, or Firm* — Mark E. Beatty; Rylander & Associates PC

(57) ABSTRACT

A universal electrical box shield includes a sealing flange including a front surface and a back surface, a first pocket extending out from the front surface of the sealing flange, an adhesive layer including a first surface bonded to the sealing flange back surface and a second surface with a removably adhesive application, wherein the sealing flange and first pocket are dimensioned to go over a selected type of electrical box. The shield may include a double-beveled first pocket and/or a domed first pocket. The shield may be a rectangular cube shape. The shield may include second and third pockets disposed proximate the ends to provide clearance for electrical box mounting screws.

9 Claims, 1 Drawing Sheet

(56) References Cited

U.S. PATENT DOCUMENTS

| | | | |
|---|---|---|---|
| 7,186,917 B1* | 3/2007 | Van De Wiele, Jr. ... | H02G 3/12 174/67 |
| 7,622,675 B2* | 11/2009 | Sutter ...................... | H02G 3/12 174/67 |
| 8,835,763 B1* | 9/2014 | Hammond ............... | H02G 3/12 174/67 |
| 2010/0252296 A1* | 10/2010 | Wiggins .................. | H02G 3/14 174/66 |

* cited by examiner

U.S. Patent
Sep. 19, 2023
US 11,764,558 B2
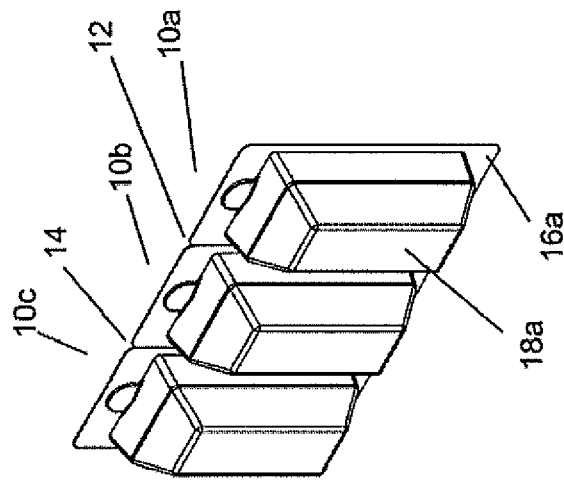
Fig. 1
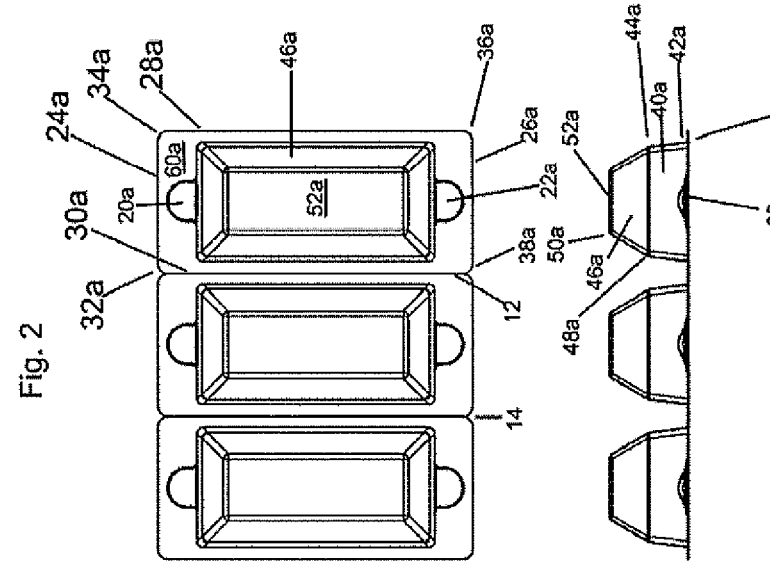
Fig. 2
Fig. 3
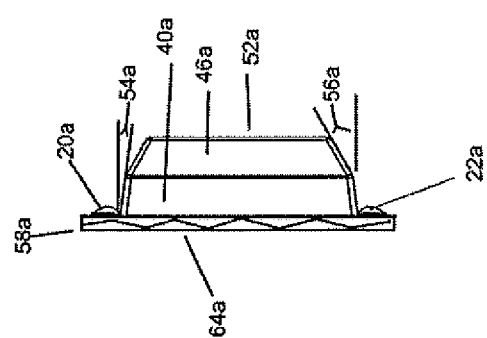
Fig. 4

UNIVERSAL ELECTRICAL BOX SHIELD

CLAIM OF PRIORITY

The present application claims priority to co-pending U.S. Provisional Patent Application Ser. No. 62/773,705 filed Nov. 30, 2018, and to co-pending U.S. patent application Ser. No. 29/696,648 filed Jun. 28, 2019. The disclosures of each of the preceding applications is hereby incorporated by reference into this Application in their entirety.

FIELD OF THE INVENTION

The present invention relates to temporary covers for sockets, such as electrical outlets, phone/data outlets, and light switches.

BACKGROUND

When a home or office is painted, or when walls are sprayed with texture compounds, the application crews either must detach outlet and switch covers, and then tape over the exposed openings, in order to ensure paint covers the wall behind the covers but does not coat the electrical components and other components that will be exposed after re-installing the covers (e.g. the switches themselves and the plastic socket plug faces). The tape is never foolproof and inevitably leaks, allowing paint to overspray the plug faces and switches. This leakage often requires time consuming cleaning or even necessitates replacement of the assembly. Additionally, the process of taping over the openings is itself time consuming. Removing tape, especially after becoming embrittled by paint and/or wall coatings, is also time consuming. In this context, "time consuming" means additional cost related to the particular job, and fewer jobs completed over a given span of time. Commercial painting is a highly competitive field, so even seemingly minor costs and lost time can mean losing a job or significant impacts on the painters' margins.

Beyond the efficiency issues, the process of taping over open electrical boxes carries heightened risks of shock from inadvertent contact with exposed wiring and components, especially considering that paint crews tend to include many unskilled workers. The ability to simply press a cover over a box increases separation distance, does not require touching the box with fingers, and therefore increases safety.

Thus, there is a need for a universal outlet cover which can be installed quickly and reliably to cover any standard size outlet or switch box, is inexpensive, easily removed, and easily scaled to cover multiple outlet boxes, and providing improved safety for users.

SUMMARY AND ADVANTAGES

A universal electrical box shield includes a sealing flange including a front surface and a back surface, a first pocket extending out from the front surface of the sealing flange, an adhesive layer including a first surface bonded to the sealing flange back surface and a second surface with a removably adhesive application, wherein the sealing flange and first pocket are dimensioned to go over a selected type of electrical box. The shield may include a double-beveled first pocket and/or a domed first pocket. The shield may be a rectangular cube shape. The shield may include second and third pockets disposed proximate the ends to provide clearance for electrical box mounting screws.

The universal electrical box shield described and claimed herein provides a low-cost apparatus to safely cover typical electrical utility mounts for light switches, fan controllers, electrical outlets and other common electrical controls/outlets found in residential and commercial buildings, during construction/remodeling activities such as painting, plastering, sanding and other activities. The shield may be applied individually, or in connected banks to cover multi-switch or multi-outlet electrical boxes. The shield prevents inadvertent contact with exposed wiring/connectors, and prevents contamination by paint, plaster, dust and other airborne contaminants into electrical areas. The simplicity, ease of use, and low cost substantially increase the ability and likelihood for individuals and businesses to use the covers thereby improving safety compliance.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 1 shows a top-front perspective view of a First Embodiment.

FIG. 2 shows front view of a First Embodiment.

FIG. 3 shows top view of a First Embodiment.

FIG. 4 shows side view of a First Embodiment.

REFERENCE NUMBERS USED IN THE DRAWINGS

The following Reference Numbers are used in the Figures:

| Reference Nr. | Description |
| --- | --- |
| 10 | Described embodiment of a universal electrical box shield |
| 10a | First shield |
| 10b | Second shield |
| 10c | Third shield |
| 12 | First partible seam |
| 14 | Second partible seam |
| 16a | Sealing flange |
| 18a | First pocket |
| 20a | Second pocket |
| 22a | Third pocket |
| 24a | First transverse edge |
| 26a | Second transverse edge |
| 28a | First lateral edge |
| 30a | Second lateral edge |
| 32a | First sealing flange corner |
| 34a | Second sealing flange corner |
| 36a | Third sealing flange corner |
| 38a | Fourth sealing flange corner |
| 40a | First sidewall |
| 42a | First sidewall first edge |
| 44a | First sidewall second edge |
| 46a | Second sidewall |
| 48a | Second sidewall first edge |
| 50a | Second sidewall second edge |
| 52a | Front face wall |
| 54a | First sidewall angle |
| 56a | Second sidewall angle |
| 58a | Adhesive layer |
| 60a | Front surface |
| 62a | Sealing flange back surface |
| 64a | Removable adhesive back surface |

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

As shown in FIGS. 1-4 a First Embodiment of a universal electrical box shield 10 is provided, including three shields 10a, 10b and 10c, connected along partible first and second longitudinal seams 12 and 14, respectively. Partible seams 12 and 14 allow easy manual separation of shields 10a, 10b and 10c for use individual use on single switch boxes and/or standard dual-plug outlet boxes. Alternatively, a user may leave several shields connected in order to cover larger boxes, such as multi-switch and/or quad-plug outlet boxes.

In the First Embodiment, shields 10a, 10b and 10c are essentially identical (except for the relative locations of partible longitudinal seams 12 and 14), so a single shield 10a will be described in detail with the understanding that shields 10b and 10c include identical structures. For purposes of description, the surfaces which mount against the wall are referred to as the "back" side, while the opposite surfaces facing away from the wall when mounted to a wall are referred to as the "front" side.

Shield 10a includes a surrounding sealing flange 16a, a first pocket 18a, and second and third pockets 20a and 22a disposed proximate opposite ends of first pocket 18a.

Sealing flange 16a is planar, including a front surface 60a and opposed back surface 62a, and extends longitudinally from first transverse edge 24a to opposite second transverse edge 26a, and from first lateral edge 28a to opposite second lateral edge 30a. In the Embodiment, first through fourth sealing flange corners 32a, 34a, 36a and 38a, respectively, are radiused for safety, and to make it easier to separate shields 10a, 10b and 10c along longitudinal seams 12 and 14.

First pocket 18a is defined by a first enclosing sidewall 40a extending out from sealing flange 16a from first sidewall first edge 42a to first sidewall second edge 44a, second enclosing sidewall 46a extending out from first sidewall 40a from second sidewall first edge 48a to second sidewall second edge 50a, and front face wall 52a which extends to and sealingly joins with second sidewall second edge 50a. First sidewall second edge 44a is sealingly joined with second sidewall first edge 48a and first sidewall first edge 42a is sealingly joined to sealing flange 16a. First sidewall 40a is slightly inclined toward the center at a first angle 54a, and second sidewall 46a is inclined toward the center at a second angle 56a, with second angle 56a greater than first angle 54a, forming a stepped-beveled structure. First pocket 18a provides clearance for common switch sizes. Alternatively, first pocket 18a could form a rectangular cube or curved dome shape. The stepped-bevel structure provides several advantages, including that it provides a reduced-volume displacement, improved structural stability for the shield 10a over a rectangular cube (which in the Embodiment is made from thin clear plastic film), and ease of manufacture as a rectilinear mold is less expensive to fabricate than a curved dome shape. Beveled and dome shapes also reduce risk of paint drips which are more prone to form along the bottom corner edges of a rectangular cube pocket 18a.

Second and third pockets 20a and 22a are formed as small bubbles projecting out from sealing flange 16a, sized to provide clearance for the top and bottom (or left and right) screw heads from the electrical box mounting screws.

Shield 10a includes an adhesive layer 58a which is disposed as a continuous barrier around the continuous outer region (i.e. proximate edges 24a, 26a, 28a and 30a) of the back surface 62a of sealing flange 16a. In the Embodiment, adhesive layer 58a is a soft foam film firmly bonded to sealing flange back surface 62a but including a removable adhesive back surface 64a to removably adhere to a wall. Adhesive layer 58a may also be composed of other double-sided tape materials, or directly applied adhesive substance. Alternatively, adhesive layer 58a may extend partially along the sealing flange back surface 62a, for example along the top and bottom portions, for situations where risk of side leakage is reduced or a lesser concern. Adhesive later 58a may include a material which is rated as an electrical insulator for improved safety.

In the Embodiment, sealing flange 16a is 4.00 inches (101.6 mm) from first transverse edge 24a to second transvers edge 26a, and 1.81 inches (46 mm) from first lateral edge 28a to second lateral edge 30a; and, first pocket 18a is 3.00 inches (76.2 mm) in length by 1.50 inches (38.1 mm) in width along the first sidewall first edge 42a; and, first pocket first and second sidewalls 40a and 46a each project outward 0.50 inches (12.7 mm), for a total depth of 1.00 inches (25.4 mm). These dimensions provide sufficient clearance to fit closely over a standard sized switch box or dual-plug outlet box in the United States.

Shields 10 may be provided in single shield configurations, in single-shield strips containing a plurality of shields connected side-by-side, or in arrays with pluralities of shields connected along side seams and end seams. The shields 10 are scalable, in that a user may simply leave a plurality of shields connected at their partible seams in order to cover a larger area.

In the Embodiment, shields 10 are formed from unitary sheets of thin clear plastic.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A universal electrical box shield, comprising:
a sealing flange including a front surface and a back surface and an encompassing perimeter edge and further including a sealing flange top portion and a sealing flange bottom portion;
a first pocket extending out from the front surface of the sealing flange and including opposed top and bottom portions and opposed lateral side portions, the top, bottom and lateral side portions defining a first pocket depth to receive a standard toggle-style light switch;
second and third pockets disposed proximate the opposed top and bottom portions of the first pocket, each of the second and third pockets defining an interior volume dimensioned to provide clearance for the electrical box mounting screws, wherein each of the second and third pocket interior volumes do not extend to the flange perimeter edge;
a continuous adhesive layer including a first surface bonded to the sealing flange back surface and a second surface with a removably adhesive application;
wherein the sealing flange and first pocket are dimensioned to go over a selected type of electrical box.

2. The apparatus of claim 1, further comprising:
wherein the first pocket is double-beveled, the first pocket top, bottom and lateral side portions defining a first beveled portion extending from the sealing flange at a first bevel angle and second beveled portion extending at a second bevel angle, the second angle bevel angle being greater than the first bevel angle.

3. The apparatus of claim 1, further comprising:
wherein the first pocket is domed.

4. The apparatus of claim 1, further comprising:
wherein the first pocket is a rectangular cube shape.

5. The apparatus of claim 2, further comprising:
a plurality of universal electrical box shields, each of the plurality of box shields further comprising opposite first and second lateral edges and wherein each of the plurality of box shield transverse and longitudinal dimensions are selected to cover a standard dual-plug outlet box, each of the plurality of box shields connected to at least one adjacent box shield along a corresponding first or second lateral edge by a partible seam extending longitudinally from proximate the sealing flange top portion to proximate the sealing flange bottom portion, the plurality of connected box shields thereby disposed in a side-by-side configuration.

6. The apparatus of claim 5, further comprising:
each of the sealing flange perimeter edges including radiused corners, the radiused corners thereby creating a separation at the respective partible seam top and bottom portions for ease of separating individual electrical box shields.

7. The apparatus of claim 5, further comprising:
the plurality of universal electrical box shields consisting of a first and a second electrical box shield.

8. The apparatus of claim 5, further comprising:
the plurality of universal electrical box shields consisting of a first, second and third electrical box shield.

9. The apparatus of claim 1, further comprising:
wherein the adhesive layer is made from a material rated as an electrical insulator.

\* \* \* \* \*